United States Patent [19]

Ludwig et al.

[11] Patent Number: 5,449,961
[45] Date of Patent: Sep. 12, 1995

[54] ELECTRIC MACHINE COOLING SYSTEM

[75] Inventors: George A. Ludwig; David G. Teraji, both of San Diego, Calif.

[73] Assignee: Solar Turbines Incorporated, San Diego, Calif.

[21] Appl. No.: 33,484

[22] Filed: Mar. 18, 1993

[51] Int. Cl.⁶ .............................................. H02K 9/00
[52] U.S. Cl. ...................................................... 310/58
[58] Field of Search ................. 310/52, 54, 55, 56, 310/57, 58, 61, 64; 415/175, 177

[56] References Cited

U.S. PATENT DOCUMENTS

| | | | |
|---|---|---|---|
| 3,439,203 | 4/1969 | Koizumi | 310/54 |
| 3,530,320 | 9/1970 | Davidson | 310/58 |
| 3,558,942 | 1/1971 | Hill et al. | 310/54 |
| 4,169,361 | 10/1979 | Baldus | 62/402 |
| 4,284,913 | 8/1981 | Barnhardt | 310/54 |
| 4,323,803 | 4/1982 | Danko et al. | 310/59 |
| 4,359,871 | 11/1982 | Strass | 60/648 |
| 4,427,908 | 1/1984 | Halmai | 310/57 |
| 4,466,239 | 8/1984 | Napoli et al. | 415/177 |
| 4,480,444 | 11/1984 | Conan | 62/402 |
| 4,573,324 | 3/1986 | Tischer et al. | 62/115 |
| 4,611,137 | 9/1986 | Sutrina | 310/54 |
| 4,831,828 | 5/1989 | Klusmier et al. | 62/6 |
| 5,214,325 | 5/1993 | Matson et al. | 310/58 |
| 5,224,822 | 7/1993 | Lenahan et al. | 415/177 |

Primary Examiner—Thomas M. Dougherty
Assistant Examiner—Matthew V. Nguyen
Attorney, Agent, or Firm—Larry G. Cain

[57] ABSTRACT

Electric machines are used to produce electrical energy or are driven by electrical energy. Such machines include a stator assembly and a rotor assembly rotationally positioned within the stator assembly. A gap is formed between the rotating element and the stationary element. To increase the life and efficiency of many electric machines, heat formed within the gap is carried away by passing a cooling media through the gap. The present electric machine includes a cooling system wherein the electric machine is positioned in an inlet plenum of a gas turbine engine. Compressed air from the gas turbine engine is used to cool the gap of the electric machine. An expansion turbine is attached to the rotor assembly upstream of the gap and has high pressure gap cooling air directed through the expansion turbine into the gap to cool the electric machine.

7 Claims, 4 Drawing Sheets

Fig_2

ELECTRIC MACHINE COOLING SYSTEM

TECHNICAL FIELD

This invention relates generally to cooling of an electric machine and more particularly to the cooling of a rotating element and a stationary element within the electric machine.

BACKGROUND ART

Generators are a type of electric machines used to produce electrical energy. Generator operation is based on the principle of electrical induction, whereby a periodic flow of electricity is produced in a loop-type conductor as a result of the periodic variation of the flux of the magnetic lines of force passing through the loop. To do this, either the loop is caused to rotate in a constant magnetic field or, alternatively, the magnetic field can be rotated. Thus, a gap is formed between the rotating element and the stationary element. Many generators cool the rotating and stationary elements by passing air through the gap between these components to increase life and efficiency of the generator. Many generators utilize air cooling in which a fan or pump is used to accelerate the air entering the gap. The use of fans and pumps add work to the air, increases the temperature of the air prior to entering the gap and hence, reduce the efficiency of the generator. Furthermore, overall efficiency will be lower because work will be required to run the fan or pump.

Several schemes have been used to cool generators and motors. For example, in U.S. Pat. No. 3,558,942 issued to Roger Gettys Hill et al. on Jan. 26, 1971, a motor is disclosed having an improved cooling means. The compressed air, from an external air compressor, is forced through circumferentially arrayed passages within the rotor whenever cooling is required.

Another cooling scheme is disclosed in U.S. Pat. No. 4,427,908 issued to Beza Halmal on Jan. 24, 1984. An electric machine has air under pressure which is circulated in a closed circuit. After the air is heated by the thermal losses of the electrical machine, the air is cooled in a heat exchanger and directed back into the machine.

Another cooling scheme is disclosed in U.S. Pat. No. 4,611,137 issued to Thomas Sutrina on Sep. 9, 1986. A machine is disclosed having a stator and a rotor forming an air gap. Grooves are provided to collect coolant under the influence of centrifugal force and a pilot pump collects coolant from the associated groove to convey the same to a pressure pump.

The solutions to the cooling problem, as mentioned above, complicate the structure, increase cost and complicate the system design used to cool generators and motors while attempting to increase efficiency.

The present invention is directed to overcoming one or more of the problems as set forth above.

DISCLOSURE OF THE INVENTION

In one aspect of the invention, an electric machine includes an outer case having a stator assembly attached thereto in a generally circular array and has a rotor assembly positioned therein forming a gap with respect to the stator assembly and the rotor assembly. The electric machine is comprised of the outer case having a manifold therein. An expansion nozzle is interposed the manifold and the rotor assembly. An expansion turbine is attached to the rotor assembly and is operatively positioned between the expansion nozzle and the gap.

In another aspect of the invention, a package is comprised of a gas turbine engine and an electric machine. The gas turbine engine includes a compressor section which produces a flow of compressed air during operation of the gas turbine engine. The generator is operatively attached to the engine. The electric machine includes an outer case having a stator assembly attached thereto in a generally circular array and a rotor assembly rotatably positioned within the stator assembly. A gap is formed with respect to the stator assembly and the rotor assembly. The package includes a means for communicating from the compressor section of the gas turbine engine to the gap formed in the electric machine.

In another aspect of the invention, a package is comprised of a gas turbine engine and electric machine. The gas turbine engine includes an inlet plenum and the electric machine is positioned in the inlet plenum.

BEST MODE FOR CARRYING OUT THE INVENTION

Figure 1:
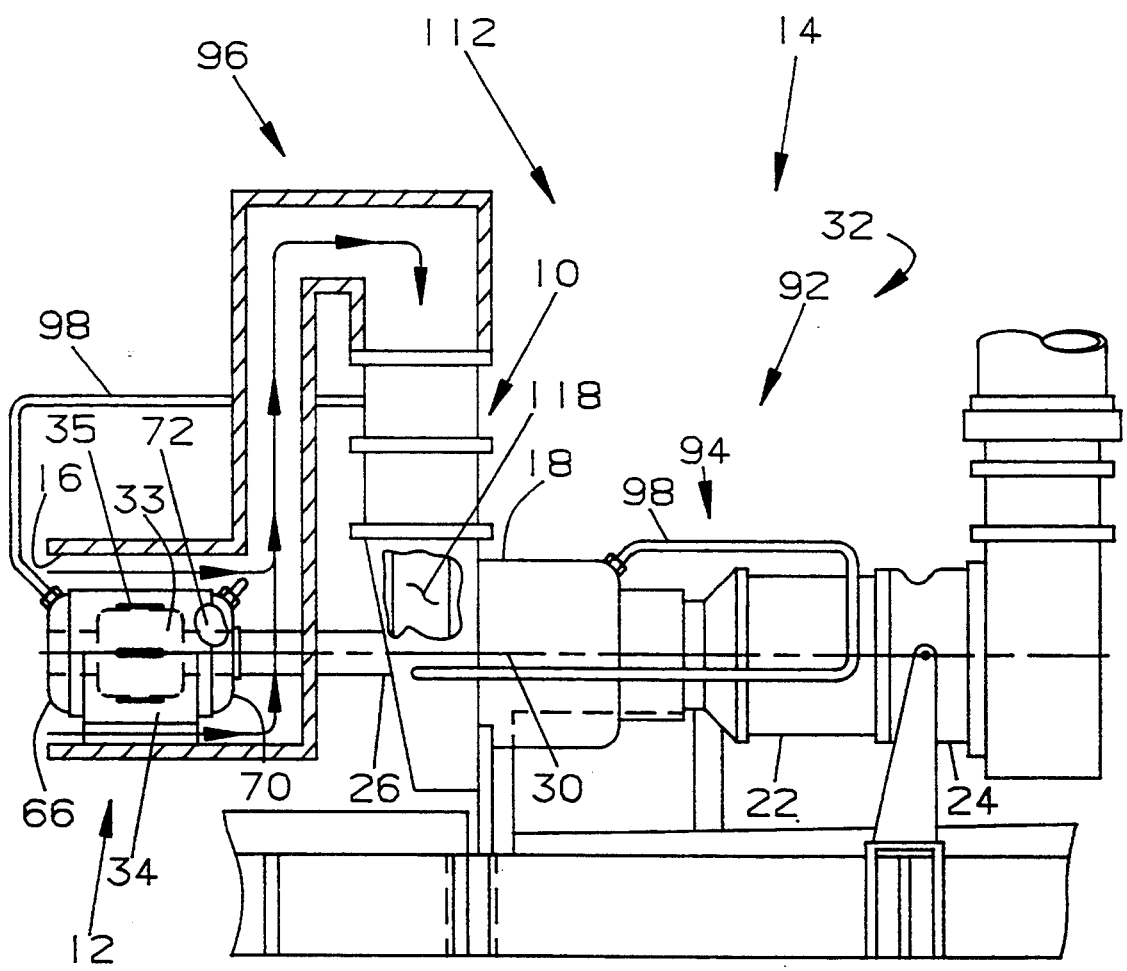
FIG. 1 is a side view of a gas turbine engine and an electric machine, such as a generator, forming a gas turbine and electric machine package embodying an electric machine cooling system of this invention.
Figure 2:
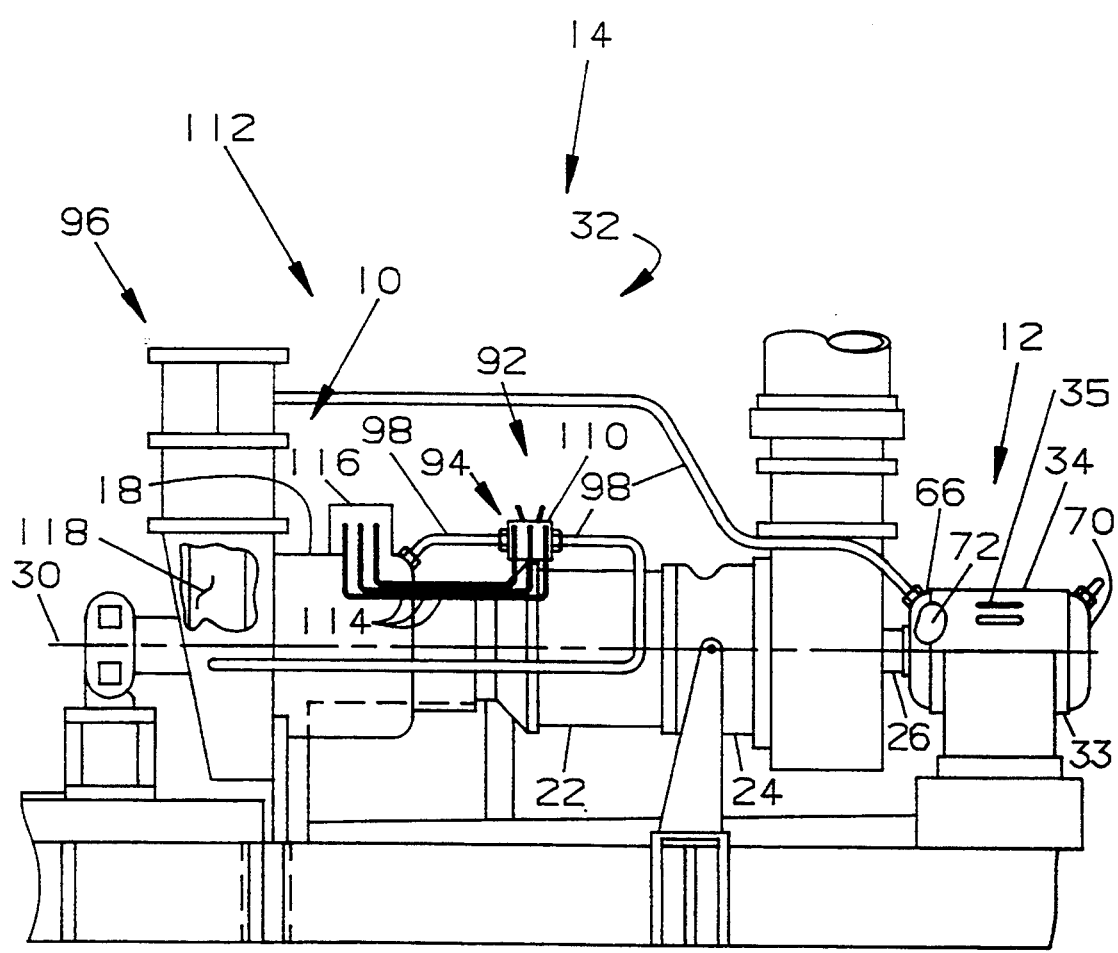
FIG. 2 is an alternative side view of a gas turbine engine and an electric machine, such as a generator, forming a gas turbine and electric machine package embodying an electric machine cooling system of this invention.

Referring to FIGS. 1 and 2, a gas turbine engine 10 and an electric machine 12, such as a generator or an electric motor, form a gas turbine and electric machine package 14, neither of which are shown in their entirety. In this application, the electric machine will be described as a generator; however, the electric machine could be an electric motor without changing the gist of the invention. The gas turbine engine 10 includes an inlet plenum 16, a compressor section 18, a combustor section 22 and a turbine section 24.

As shown in FIG. 1, during operation of the engine 10, atmospheric air, as shown by the arrows, is drawn through the inlet plenum 16 and as a result of the compressor section 18 produces an air flow which is divided into a cooling portion and a combustion portion. In this application, between about 1.0 percent and 2.0 percent of the gas turbine engine 10 compressor section 18 air flow is used to cool the generator 12. To provide further cooling of the generator 12, the generator 12 has been positioned within the inlet plenum 16 and the intake air is passed over and around the generator 12. As an alternative, best shown in FIG. 2, the generator could be positioned outside the inlet plenum 16 without changing the gist of the invention.

Figure 3:
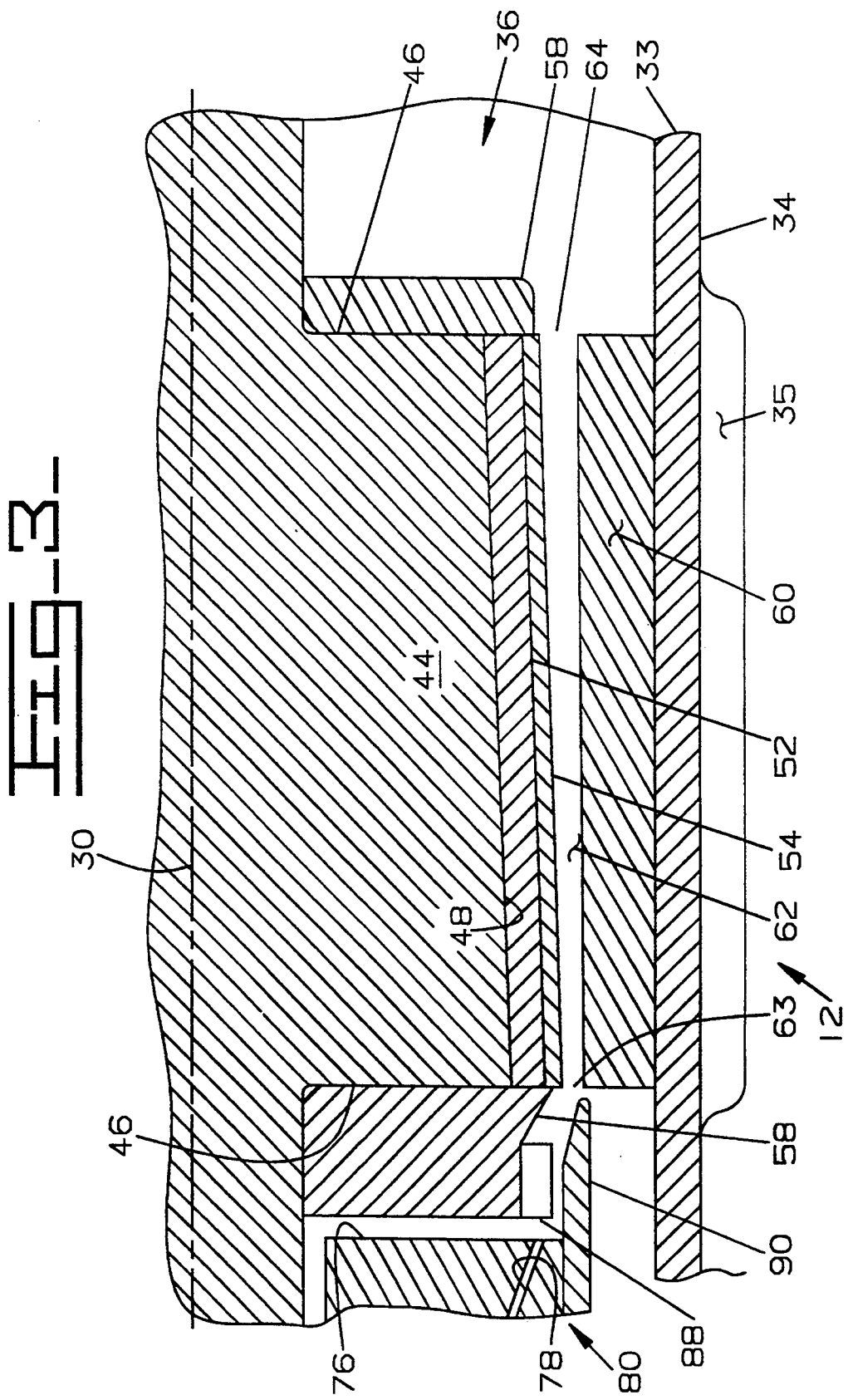
FIG. 3 is an enlarged partially sectioned view of a portion of the electric machine cooling system.

As further shown in FIG. 3, the generator 12 includes a central axis 30, a cooling system 32 and an outer case 33 having an external surface 34 and a plurality of cooling fins 35 formed thereon. Rotatably positioned within the case 33 is a rotor assembly 36 being supported at each end in a conventional manner. The rotor assembly 36 is drivingly connected to a center shaft 26. In this application, the rotor assembly 36 includes a core 44 having a pair of ends 46 and a mounting surface 48 defined therebetween. A plurality of permanent magnets 52 are attached to the mounting surface 48 of the core 44 and has a generally circular sleeve 54 positioned about the magnets 52 and the core 44. A pair of end caps 58 are attached near each of the ends 46. As an alternative, the magnets 52 could be energizable rather than being permanent magnets without changing the essence of the invention.

Figure 4:
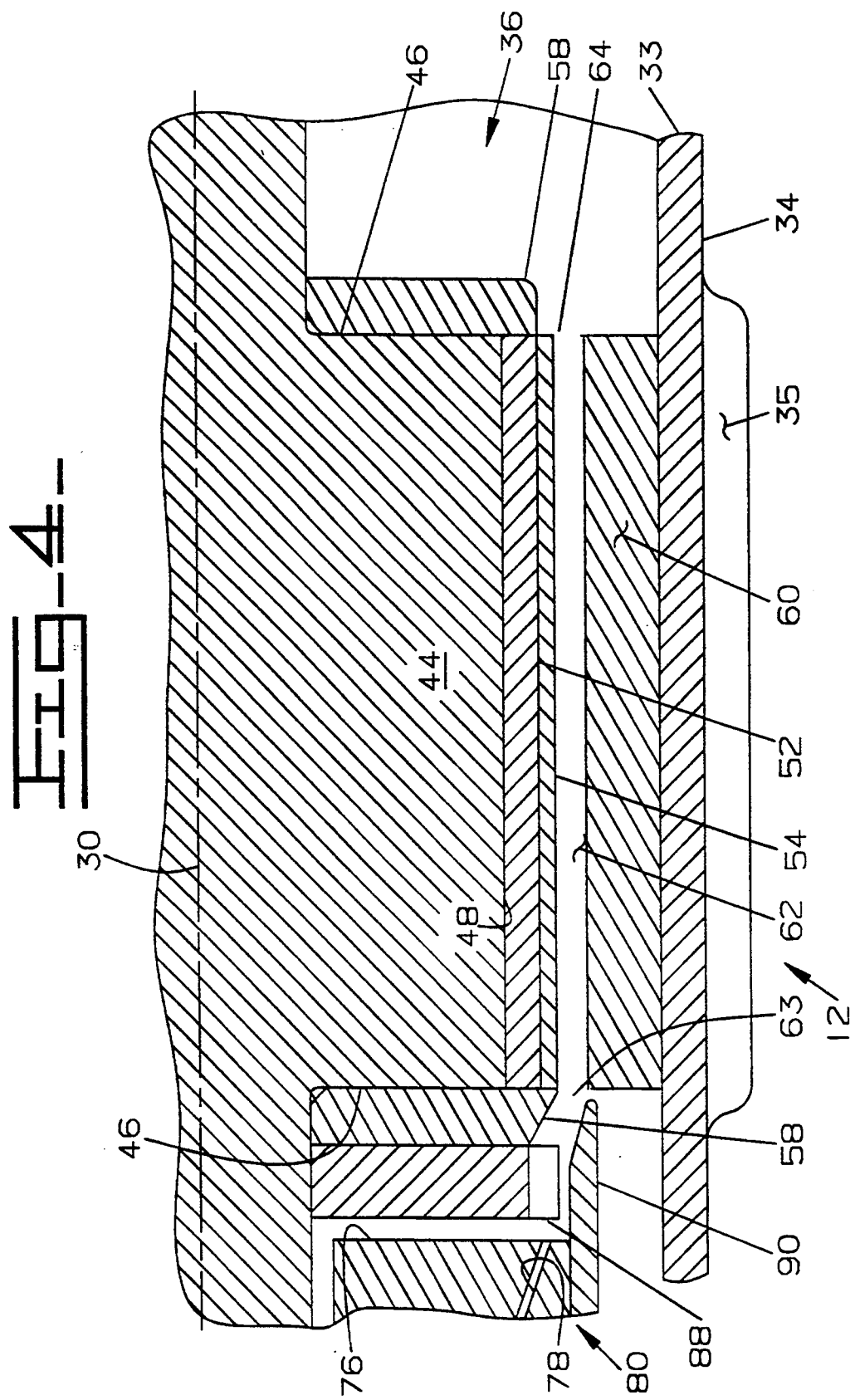
FIG. 4 is an enlarged partially sectioned view of a portion of an alternate electric machine cooling system.

A stator assembly 60 is attached to the outer case 33 in a predetermined radially spaced, encircling relationship to the rotor assembly 36 forming a gap 62 therebetween. In one aspect of this invention, the gap 62 has a tapered configuration and includes an inlet end 63 and an outlet end 64. The gap 62 at the inlet end 63 has a preestablished width which is equal to about 1.0 mm and a preestablished width at the outlet end 64 equal to about 2.0 mm. The gap 62 is determined by the magnetic flux density of the magnets 52 required to produce the design point power, and the circular sleeve 54 thickness required to keep the magnets 52 on the core 44 during peak operation. As the gap 62 increases, the output power can be held constant by increasing the magnet thickness resulting in the air gap flux density remaining generally constant. The magnetic flux density of the magnets, the circular sleeve 54 thickness, and the magnet thickness are all variables that have to be optimized in order to vary the width of the preestablished gap 62. As an alternative, shown in FIG. 4, the gap 62 could have a uniform preestablished width at both the inlet end 63 and the outlet end 64. If a uniform preestablished width is to be used, the width would be about 1.0 mm. The stator assembly 60 includes a plurality of windings, not shown, through which a current passes during operation of the generator 12. As an alternative, the plurality of uniform windings could be connected to the core 44 and rotated during operation of the generator 12 and the plurality of magnets 52 could be connected to the outer case 33 and remain stationary.

The outer case 33 includes a first cap 66 removably attached to one end and a second cap 70 removably attached to the other end thereof. Each of the caps 66,70 includes an annular manifold 72. The annular manifold 72 within the first cap 66 is in communication with the high pressure side of the compressor section 18. The annular manifold 72 of the second cap 70 is in communication with the low pressure side of the compressor section 18. As an alternative, the annular manifold 72 within the second cap 70 could be in communication with the atmosphere by way of a filter, not shown. Interposed the manifold 72 and the rotor assembly 36 is a preswirler or expander nozzle 76 having a plurality of circumferentially arranged nozzle openings 78 therein being of conventional design. An expander turbine 80 is attached to the core 44 between the expander nozzle 76 and the rotor assembly 36. In this application, the expander turbine 80 is formed as an integral part of one of the end caps 46. As an alternative and shown in FIG. 4, the expander turbine 80 could be pressed onto the rotor assembly 36. Although not preferred as an alternative, the expander turbine 80 could be attached by a plurality of bolts and threaded holes without changing the gist of the invention. The expander turbine 80 includes an outer portion having a plurality of circumferentially arranged blades 88 thereon being generally axially aligned in operative relationship between the expander nozzle 76 and the inlet end 63 of the gap 62. A directing portion 90 directs the air through the expansion turbine 80 and toward the inlet end 63 of the gap 62.

A means 92 for communicating from the compressor section 18 to the generator 12 includes a means 94 for regulating the amount of cooling air drawn from the compressor section 18 and a means 96 for controlling the temperature of the cooling air after being drawn from the compressor section 18. Further included, as shown FIG. 1, is a tube or series of tubes 98 connecting the compressor section 18 with the generator 12. Further included, as shown in FIG. 2, is a series of tubes 98 connecting the compressor section 18 with the means 94 for regulating and the generator 12. In the preferred embodiment, a single tube 98 is sized to provide the means 94 for regulating. As an alternative, an orifice could be positioned within the tube 98 and a preestablished flow of cooling air would pass therethrough.

As an alternative shown in FIG. 2, the means 94 for regulating the amount of cooling air drawn from the compressor section 18 could include an electronically controlled flapper valve 110, of conventional design. The valve 110 would be operatively positioned in the tube 98 between the compressor section 18 and one of the annular manifolds 72. The valve 110 would be movable between an open position, wherein air is communicated between the compressor section 18 and the gap 62 and a closed position, wherein the quantity of air communicating between the compressor section 18 and the gap 62 is reduced. A means 112 for opening and closing the valve 110 would be operatively attached to the means 94 for regulating by a plurality of wires 114 and depending on several variables such as temperature within the gap 62 and/or overall generator 12 temperature, speed of the generator 12 and power requirements of the generator 12 determines the position of the valve 110 between the open and closed position. For example, the means 112 for opening and closing could include an onboard computer 116 having speed sensors and temperature sensors connected thereto, not shown. The computer 116 monitors the signals from the sensors and establishes the cooling requirements for the generator 12 by varying the position of the flapper valve 110 between the open position and the closed position.

The means 96 for controlling the temperature of the air gap 62 cooling air after being drawn from the compressor section 18 and prior to entering the gap 62 is operatively disposed between the compressor section 18 and the gap 62. The means 96 for controlling is interposed the compressor section 18 and the generator 12. In this application, a simple heat exchanger 118 is positioned within the tube 98. If the flapper valve 110 is used, the heat exchanger 118 is positioned between the flapper valve 110 and the generator 12. In this application, the gas turbine engine 10 compressor inlet air is used as the heat exchanger 118 cooling media or donor fluid and is drawn through the inlet plenum 16 of the turbine engine 10 after passing through conventional filters, not shown, to the heat exchanger 118. After passing through the heat exchanger 118 the cooling media or donor fluid is communicated back into the engine intake prior to being compressed. As an alternative, the donor fluid could be dumped to atmosphere or to another source after passing through the heat exchanger. Furthermore, as an alternative to air, any donor fluid such as water could be used.

INDUSTRIAL APPLICABILITY

In operation, as shown in FIG. 1, the gas turbine engine 10 is started and brought up to operating speed. As the gas turbine engine 10 operates, intake air is drawn through the inlet plenum 16, in which the generator 12 is positioned, prior to entering into the compressor section 18 of the engine 10. The cooling fins 35 on the outside of the outer case 33 dissipate heat from the generator 12 reducing the operating temperature of the generator 12 and increasing the inlet temperature of the combustion air. A demand for electrical energy is sent to the generator 12. The rotor assembly 34 which is connected to the center shaft 26 of the gas turbine engine 10 rotates as the engine increases in speed. The permanent magnets 52 on the rotor assembly 34 are caused to rotate in the flux loop of the stator assembly 60 producing an electrical current.

The aerodynamic shear forces in the generator air gap 62 causes a drag loss which is evidenced by heating of the air gap fluid. Additionally, the periodic variation of the flux of the magnetic lines of force passing through the loop causes heat in addition to the electrical current. Thus, cooling of the generator 12 components is required to increase life and dependability. A portion of the flow of compressed air from the turbine engine 10 compressor section 18 passes through the tube 98 into the heat exchanger 118 and is used to cool the generator 12. The compressed air after passing through the heat exchanger is used to cool the air gap 62. Gas turbine engine 10 intake air, after passing through the filters but prior to being compressed, is used to cool the heat exchanger 118. After the intake air has been used to cool the heat exchanger 118, the intake air is communicated through the intake plenum 16 to the compressor section 18 of the gas turbine engine 10 to be compressed and used as either the combustion air or the cooling air. From the heat exchanger 118, the compressed gap cooling air which has been cooled, enters into the manifold 72 within the first cap 66. From the manifold 72, the gap cooling air enters into the nozzle openings 78. The gap cooling air exits the nozzle openings 78 and is guided into contact with the plurality of blades 88 on the expander turbine 80 by the expander nozzle 76. Energy from the cooling air drives the plurality of blades 88 and adds some rotational energy to the rotor assembly 36 of the system. The energy which is transferred into the expander turbine 80 further reduces the temperature of the cooling air prior to entering the gap 62. From the plurality of blades 88, the air is guided by the directing portion 90 into the gap 62. The blading 88 is so designed that the exit mean absolute tangential velocity is approximately one half of the generator rotor tangential velocity at its outer diameter. Thus, the coolant fluid tangential velocity is aligned with the mean tangential velocity of the fluid in the air gap 62, which minimizes the flow of gap cooling air through the air gap 62. The gap cooling air passing through the gap 62 and reduces the temperature of the generator 12 to an acceptable temperature. After the cooling air has passed through the gap 62, the spent air enters the annular manifold 72 within the second cap 70 and is circulated to the gas turbine engine 10 by an additional tube 98.

The inlet end 63 of the gap 62, having a preestablished width, and the outlet end 64 of the gap, having a preestablished width being greater than the width at the inlet end 63, reduces the viscous heating in the gap 62. For low rotational design speed the constant width air gap 62 is of little consequence, however, for high rotational design speeds the circumferential fluid whirl can significantly increase the frictional or drag loss in the gap 62. The increased friction or drag reduces the efficiency of the generator or motor 10. The increasing width of the gap 62 from the inlet end 63 to the outlet end 64 reduces the axial velocity and tangential velocity in the gap 62 and results in a reduction of the friction and pressure loss.

Further streamlining of the rotor assembly 34 also reduces friction and drag especially when being used in high speed operations, such as, above about 10,000 RPM. For example, with the end caps 46 being pressed onto the core 44 any heads of bolts or recesses are eliminated. Furthermore, with the expander turbine 80 pressed onto the core 44 additional heads of bolts or recesses are eliminated.

If the alternative of the flapper valve 110 is used to control the temperature of the generator 12, the air passes through the tube 98 into the flapper valve 110 wherein the position thereof is moved between the closed position and the open position by the means 112 for opening and closing. For example, if the means 96 for controlling senses that the temperature within the generator 12 is within an acceptable temperature range, the valve 110 will remain in the closed position. However, if the temperature within the generator 12 is above an acceptable temperature range, the valve 110 will be moved toward the open position until the flow of coolant is appropriate to bring the temperature within the generator 12 down to an acceptable temperature range.

The generator cooling system 32 disclosed herein increases the efficiency of the generator 12 and reduces the cost and complexity of the cooling system. For example, the system more efficiently cools the cooling fluid and uses a portion of the energy taken from the cooling fluid during the cooling process to add rotational energy to the generator 12. The use of compressed air as the source for the gap cooling coolant eliminates additional fans or pumps and complex grooving requirements. The positioning of the generator 12 within the inlet plenum 16 further cools the generator 12 and increases the thermal efficiency of the generator 12 and the gas turbine engine 10. sources of cooling fluid are also eliminated.

Other aspects, objects and advantages of this invention can be obtained from a study of the specification, drawings and the appended claims.

We claim:

1. A gas turbine engine and electric machine package comprising:

a compressor section being positioned in the gas turbine engine producing a flow of compressed air, a portion of said flow of compressed air being a cooling air, during operation of the gas turbine engine;

an outer case being a part of the electric machine, said electric machine including a stator assembly attached thereto in a generally circular array and having a rotor assembly rotatable positioned within the stator assembly forming a gap with respect to the stator assembly and the rotor assembly, an annular manifold being in fluid communication with the compressor section, an expander nozzle interposed the annular manifold and the rotor assembly and an expander turbine generally axially aligned in operative relationship to the expander nozzle and the gap;

said expansion nozzle includes a plurality of circumferentially arranged nozzle openings and said expansion turbine includes a plurality of circumferentially arranged blades, said plurality of circumferentially arranged nozzle openings are generally axially aligned with said plurality of circumferentially arranged blades; and said electric machine further includes a means for regulating the amount of cooling air drawn from the compressor section, said means for regulating being positioned between the compressor section and the manifold in the electric machine.

2. The gas turbine engine and electric machine package of claim 1 wherein said electric machine further includes a means for controlling the temperature of the cooling air, said means for controlling the temperature of the cooling air being interposed the compressor section and the electric machine.

3. The gas turbine engine and electric machine package of claim 2 wherein said means for controlling the temperature of the cooling air includes a heat exchanger.

4. The gas turbine engine and electric machine package of claim 3 wherein said heat exchanger is an air to air heat exchanger.

5. A gas turbine engine and electric machine package comprising;

a compressor section being positioned in the gas turbine engine producing a flow of compressed air, a portion of which being a cooling air, during operation of the gas turbine engine;

an outer case being apart of the electric machine, said electric machine including a stator assembly attached thereto in a generally circular array and having a rotor assembly rotatable positioned within the stator assembly forming a gap with respect to the stator assembly and the rotor assembly, an annular manifold being in fluid communication with the compressor section, an expander nozzle interposed the annular manifold and the rotor assembly and an expander turbine generally axially aligned in operative relationship to the expander nozzle and the gap;

said expansion nozzle includes a plurality of circumferentially arranged nozzle openings and said expansion turbine includes a plurality of circumferentially arranged blades, said plurality of circumferentially arranged nozzle openings are generally axially aligned with said plurality of circumferentially arranged blades; and a means for controlling the temperature of the cooling air, said means for controlling the temperature of the cooling air being interposed the compressor section and the electric machine.

6. The gas turbine engine and electric machine package of claim 5 wherein said means for controlling the temperature of the cooling air includes a heat exchanger.

7. The gas turbine engine and electric machine package of claim 6 wherein said heat exchanger is an air to air heat exchanger.

* * * * *